Patented Sept. 1, 1925.

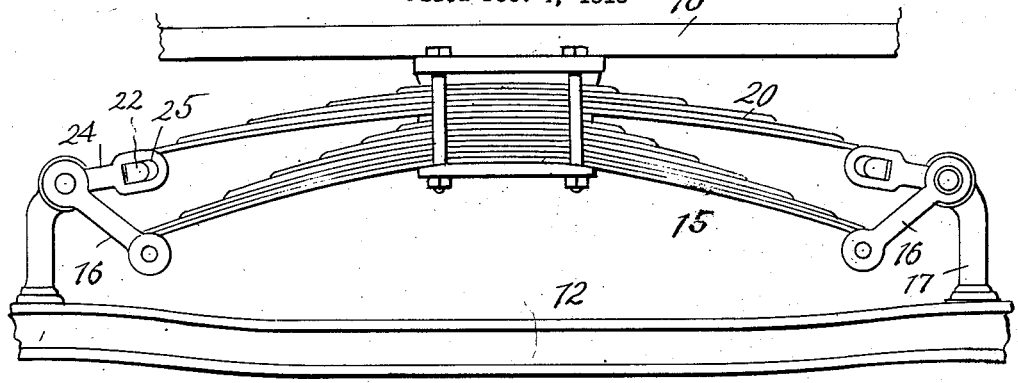
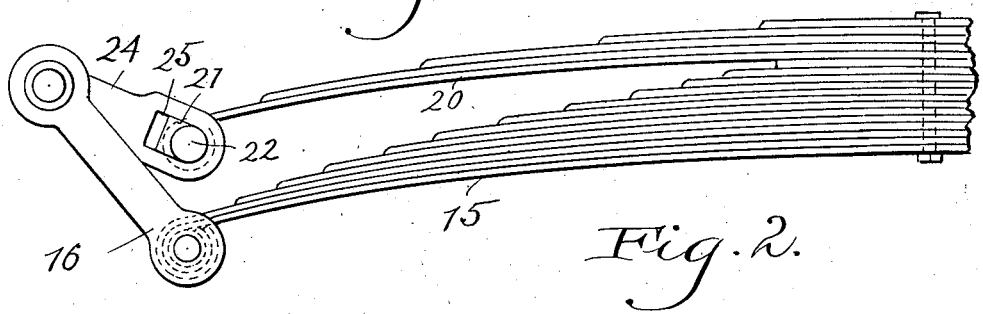
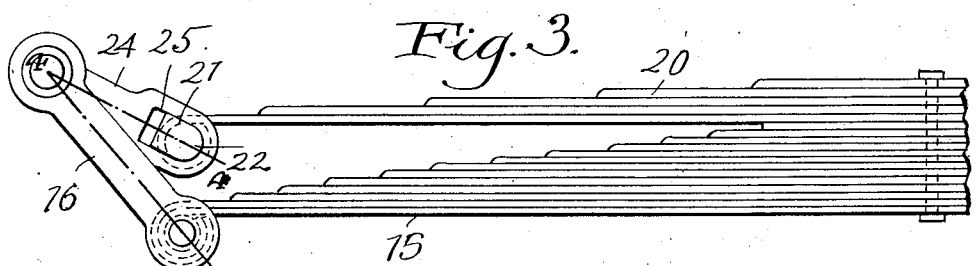
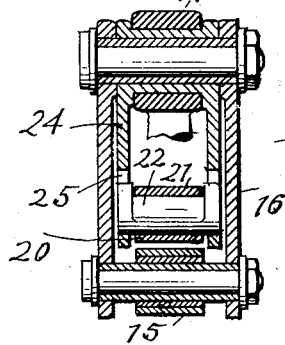

1,552,021

UNITED STATES PATENT OFFICE.

SAMUEL K. WELLMAN, OF CLEVELAND HEIGHTS, AND GORDON R. PENNINGTON, OF CLEVELAND, OHIO.

VEHICLE SPRING SUSPENSION.

Application filed December 4, 1919. Serial No. 342,314.

*To all whom it may concern:*

Be it known that we, SAMUEL K. WELLMAN and GORDON R. PENNINGTON, citizens of the United States, and residents, respectively, of Cleveland Heights, in the county of Cuyahoga and State of Ohio, and Cleveland, in the county of Cuyahoga and State of Ohio, have invented a certain new and useful Improvement in Vehicle Spring Suspensions, of which the following is a full, clear, and exact description.

This invention relates to vehicle spring suspensions of the type having an ordinary spring suspension, combined with an auxiliary spring which will perform no load supporting function until the vehicle is loaded to a predetermined amount, but which, after such predetermined load is exceeded, will co-operate with the ordinary spring suspension in yieldingly supporting the loaded body.

The main object of the invention is to provide a spring suspension of the character referred to in which the auxiliary spring or springs will come into action gradually and without shock when the effective vehicle load is suddenly increased, as when the vehicle is traveling over a rough road.

In carrying out the invention, the main or ordinary spring suspension of the vehicle can, of course, be of any desired construction. The auxiliary spring, also, and its connections with the sprung or body part and unsprung or running gear parts of the vehicle can be formed and arranged in various ways to attain the above object. We prefer, however, to use a laminated auxiliary spring and connections of the character shown in the accompanying drawing.

In the drawing, Fig. 1 is a front elevation of the invention applied to the front end of a vehicle, and shows the position of the parts when the vehicle body is not loaded at all. Fig. 2 is a similar view of one side of said spring suspension and shows the position of the parts when the body is loaded to the amount at which the auxiliary spring becomes operative, and Fig. 3 is a similar view showing the position of the parts when the body is loaded to the limit. It might be stated here that this view is merely for the purpose of illustrating the manner in which the auxiliary spring will act, and that, it is not desirable that the body shall ever be loaded to a degree which will cause the spring to assume the position shown. Fig. 4 is a sectional side view on lines 4—4—4 on Fig. 3 of the connections between the ends of the two springs and the axle.

Referring to the parts by reference characters, 10 represents a part of the body of the vehicle, and 12 a part of the running gear, preferably an axle on which the body is supported through the spring suspension. 15 represents an ordinary leaf spring which is centrally clamped to the body, and which, at its ends, is connected by shackles 16 to brackets 17 fixed to the front axle. The shackles are pivoted to the brackets, and are likewise pivotally connected with the ends of the springs by means of pins which go through eyes in the ends of the springs.

20 represents the auxiliary leaf spring. This preferably overlies the ordinary leaf spring and is clamped to it and to the body by the same clamping device employed to clamp the leaf spring 10 to the body.

At both ends of this auxiliary spring is an eye 21 through which passes a pivot pin 22. Associated with each end of this auxiliary spring is a shackle 24 which is pivotally connected with the running gear and preferably to the same bracket and by means of the same pivot pin through which the shackles 16 are connected to said running gear. The auxiliary spring and these shackles are of such shape and length that when the body is unloaded said shackles occupy an approximately horizontal position. The end of each shackle adjacent the auxiliary spring is forked; the end of the spring goes between the forks, and in each of the forks is a longitudinal slot 25. A pivot pin 22 goes through the eye at each end of the spring; and the projecting ends of this pivot pin which are preferably flattened project into the slots 25, wherein they may slide but may not turn. When the parts are in this position the pivot pins are not in engagement with the ends of the slots.

When, however, a load is put into the wagon body the main spring 15 will carry the load and will straighten out and the body will descend relative to the running gear. The auxiliary spring will go down with the body but will not be deflected, since it is not sustaining any of the load. As this auxiliary spring goes down it will swing down the two shackle links connected with its ends. As these shackles are swung down the ends of the slots therein will, when they have swung down a sufficient distance, come into engagement with the pivot pins 25. Until this engagement takes place the auxiliary spring sustains no load, and performs no load supporting function; but when, as the result of increasing the load in the body, the pins come into engagement with the ends of the slots in the shackle links, this auxiliary spring begins and thereafter continues to bear a share of the load, and to co-operate with the spring 15 in yieldingly supporting the loaded body.

It will be observed that the movement of the ends of the shackle link slots, as the links swing downward from their horizontal positions, has two components, one vertically downward and the other horizontally outward; and as the horizontal component is exceedingly small during the first part of the downward swing of the links and while the auxiliary spring is inactive, the engagement of the ends of the slots with the pivot pins occurs at a low velocity notwithstanding the velocity of the relative movement of the vehicle body and running gear is many times as great and consequently said engagement of the pin and slot parts occurs without noise or shock, and the application of the load to the auxiliary spring as the vehicle body and running gear continue to approach each other is very slow and gradual indeed. It will also be noted that whenever either spring is under load stress its connecting link (24 or 16) is disposed at a substantial angle to the spring, so that the springs are not subjected to the destructive effect of a straight line toggle action. It often happens that the load is such that the main springs are capable of sustaining it when the vehicle is passing over a smooth surface but the auxiliary spring comes into action when the vehicle encounters ruts and bumps. With prior forms of construction known to me this intermittent loading of the auxiliary spring in passing over rough roads occurs quite suddenly with resultant shock and noise, while with my improved construction the loading of the auxiliary spring is gradual and slow in comparison with the rate of movement of the body toward the running gear and occurs without shock or noise.

It is to be observed that in speaking of the body and running gear of the vehicle, we refer to its sprung and unsprung parts, respectively, the term body including the chassis frame as well as the body proper.

Changes may be made in the specific embodiment of the invention shown, without departure from the invention, provided the means stated in any of the appended claims or the equivalent of such means are employed.

Having described our invention, we claim:—

1. The combination with a vehicle body, running gear therefor, and a spring suspension through which the body is supported from the running gear, of an auxiliary spring, connections between said auxiliary spring and one of the two vehicle parts first mentioned, and means interposed between said spring and the other of said two vehicle parts operable only after a predetermined relative movement of the body and running gear toward each other to apply the load to said auxiliary spring gradually and slowly in relation to the rate of movement of the body toward the running gear as the body and running gear continue to approach each other.

2. The combination with a vehicle body, running gear therefor, and a spring suspension through which the body is supported from the running gear, of an auxiliary spring, connections between said auxiliary spring and one of the two vehicle parts first mentioned, and load-transmitting means interposed between said spring and the other of said two vehicle parts and comprising parts adapted positively to engage each other at a low velocity while the body and running gear are approaching each other at a velocity many times as great and by said engagement to apply the load to said auxiliary spring gradually and slowly in relation to the rate of movement of the body toward the running gear as the body and running gear continue to approach each other.

3. The combination with a vehicle body, running gear therefor, and a spring suspension through which the body is supported from the running gear, of an auxiliary spring, connections between said auxiliary spring and one of the two vehicle parts first mentioned, and load transmitting means interposed between said spring and the other of said two vehicle parts and comprising loosely connected parts adapted positively to engage each other at a low velocity when the body and running gear approach each other at a velocity many times as great and by said engagement to apply the load to said spring gradually and slowly in relation to the rate of movement of the body toward the running gear as the body and running gear continue to approach each other.

4. The combination of a vehicle body, running gear therefor, and a spring suspension through which the body is supported from the running gear, of an auxiliary spring, connections between said auxiliary spring and one of the two vehicle parts first mentioned, means comprising a link interposed between the other of said parts and said spring and having a lost motion connection with one of them, said link being adapted to swing and cause positive engagement at a low velocity of the lost motion parts with each other as the body and running gear approach each other at a velocity many times as great and by said positive engagement to apply the load to said spring gradually and slowly in relation to the rate of movement of the body toward the running gear as the body and running gear continue to approach each other.

5. The combination with a vehicle body, running gear therefor, and a spring suspension through which the body is supported from the running gear, of an auxiliary leaf spring connected to the body, and means comprising a link interposed between the thin end of the spring and the running gear and having a combined sliding and swinging connection with one of said parts, said link being disposed in substantially horizontal position when the body is unloaded or lightly loaded and being adapted after it swings downward somewhat to cause positive engagement at low velocity of the relatively sliding parts with each other as the body and running gear approach each other at a velocity many times as great and by said positive engagement to apply the load to said auxiliary spring gradually and slowly in relation to the rate of movement of the body toward the running gear as the body and running gear continue to approach each other.

6. The combination with a vehicle body and running gear and a spring suspension through which the body is supported from the running gear, of an auxiliary spring interposed between the body and running gear, and means for operatively connecting the auxiliary spring to the body and running gear and comprising relatively movable metallic parts arranged to move into positive engagement with each other when the body and running gear approach each other, the said auxiliary spring and connecting means being constructed and arranged to cause positive engagement of said relatively movable parts and the consequent loading of the auxiliary spring only when the body and running gear have approached within a predetermined distance of each other and to effect such engagement with each other at a low velocity while the body and running gear are approaching each other at a velocity many times as great and thereupon to apply the load to said spring gradually and slowly in relation to the rate of movement of the body toward the running gear as the body and running gear continue to approach each other.

7. The combination of a vehicle body, running gear therefor and means for resiliently supporting the body from the running gear, said means comprising a pair of leaf springs, connections between said springs and one of the two vehicle parts first mentioned, and links interposed between the other of said parts and said springs, the said links and their cooperating parts being constructed and arranged to subject the springs to stresses only when the links are disposed at substantial angles to their respective springs and being operable to sustain at least the major part of the load through one of said springs during the first part of the relative movement of the body and running gear toward each other and after such first part of said movement to apply the load to the other spring gradually and slowly in relation to the rate of movement of the body toward the running gear as the body and running gear continue to approach each other.

In testimony whereof we hereunto affix our signatures.

SAMUEL K. WELLMAN.
GORDON R. PENNINGTON.